(No Model.)  A. L. WAITE, Dec'd.  2 Sheets—Sheet 1.
ANNIE L. WAITE, Administratrix.
ATTACHMENT FOR AIR BRAKE SYSTEMS.

No. 463,085.  Patented Nov. 10, 1891.

(No Model.) A. L. WAITE, Dec'd. 2 Sheets—Sheet 2.
Annie L. Waite, Administratrix.
ATTACHMENT FOR AIR BRAKE SYSTEMS.
No. 463,085. Patented Nov. 10, 1891.
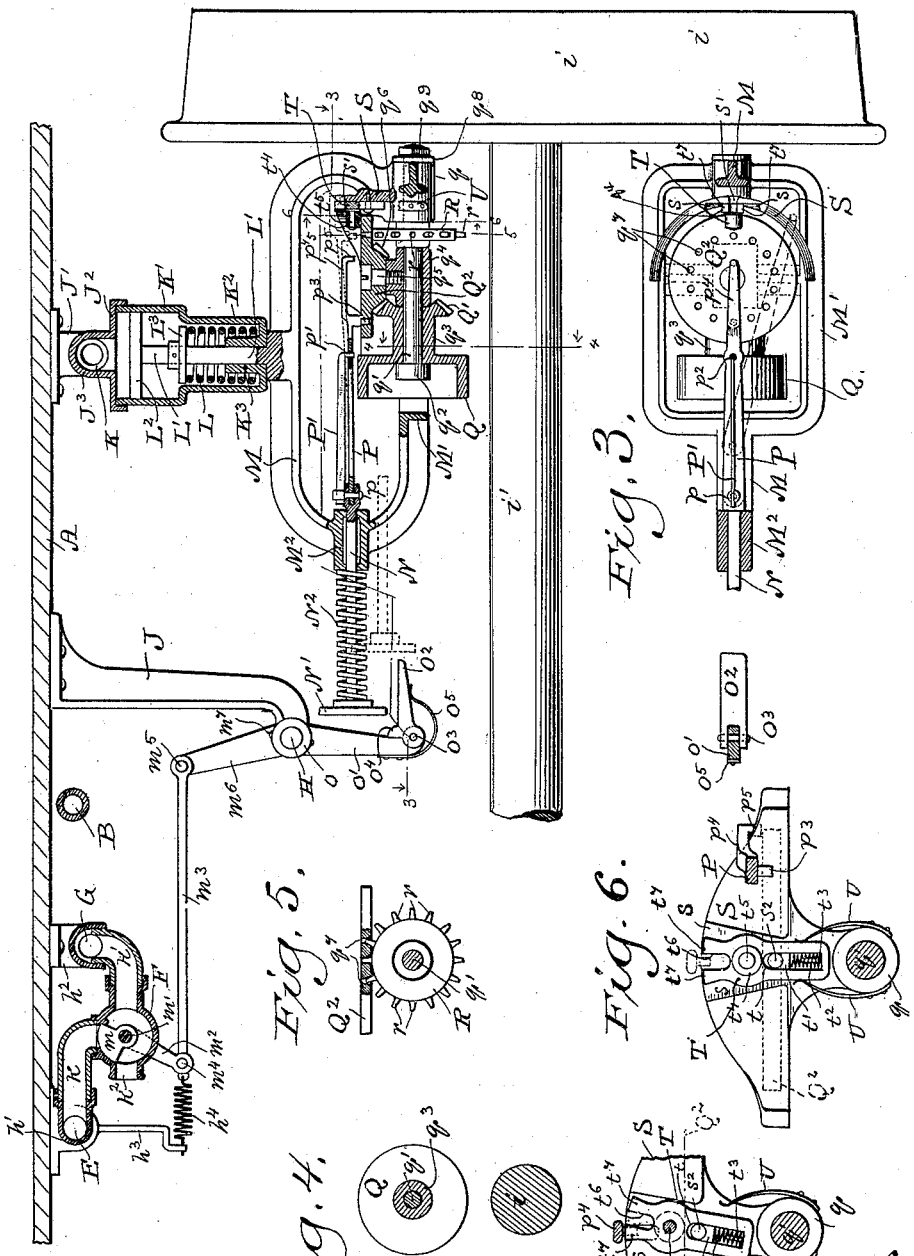

UNITED STATES PATENT OFFICE.

ARTHUR L. WAITE, OF BARABOO, WISCONSIN; ANNIE L. WAITE ADMINISTRATRIX OF SAID ARTHUR L. WAITE, DECEASED.

ATTACHMENT FOR AIR-BRAKE SYSTEMS.

SPECIFICATION forming part of Letters Patent No. 463,085, dated November 10, 1891.

Application filed March 12, 1891. Serial No. 384,808. (No model.)

*To all whom it may concern:*

Be it known that I, ARTHUR L. WAITE, a citizen of the United States, and a resident of Baraboo, in the county of Sauk, and in the State of Wisconsin, have invented certain new and useful Improvements in Attachments to Railway-Air-Brake Systems; and I do hereby declare that the following is a full, clear, and exact description thereof.

My invention relates to attachments to railway-air-brake systems; and it consists in certain peculiarities of construction, as will be fully set forth hereinafter, and subsequently claimed.

In the drawings, Figure 1 is a plan view, partially in section, of the brake system embodying my present invention applied to a four-wheel car-truck, only the wheels of said truck and their axles being shown. Fig. 2 is an enlarged vertical transverse section on the line 2 2 of Fig. 1. Fig. 3 is a detail horizontal section on line 3 3 of Fig. 2. Figs. 4, 5, and 6 are detail vertical sections on the lines 4 4, 5 5, and 6 6, respectively, of Fig. 2. Fig. 7 is a view of the parts shown in Fig. 6 in another position.

In Fig. 1, A represents in dotted lines the outline of the bottom of a railway-car, showing at $a$ the supporting-bracket of the brake-pipe B, which supplies the auxiliary reservoir C with air through branch pipe $b$, triple valve $c$, and branch pipe $d$, the passage being open from the brake-pipe B to the auxiliary reservoir C when the brakes are off, and hence the pressure of air in B and C is equal, all as common and well known in the Westinghouse and analogous systems.

D is an ordinary brake-cylinder; $e$, its piston-rod; $f$ $f'$, main brake-levers; $g$ $g$, lever connecting-rods; $h$ $h$, brake-beams, (which in this illustration are shown as braking from the inside of the wheels in a four-wheel truck;) $i$ $i$, the wheels; $i'$ $i'$, their axles; $j$ $j'$, the truck-levers; $j^2$, their connecting-rod; $j^3 j^3$, the lever-supports on the brake-beams $h$ $h$; $f^2$, the rod running to the hand brake-wheel; and $f^3$ the rod running to the rod $j'$ of the corresponding truck at the other end of the car (not shown,) which truck corresponds to that shown in Fig. 1. The lever $j$ may, if desired, be pivoted to the truck-frame. (Not shown.) It will be understood that if the brake-beams $h$ are applied at the outside of the wheels, then the lever connections would be correspondingly changed to accommodate this arrangement, this being a mere matter of mechanical skill and convenience, and the same is true if a six-wheel truck is used instead of a four-wheel truck, as shown.

E E' are air-pipes, forming part of my invention, leading from the auxiliary reservoir C, and each having a branch $k$, leading to a rotary-valve casing F, which has a branch pipe $k'$, leading to air-pipe G, (the said pipes F and G being suspended beneath the bottom of the car, as shown by the hangers $h'$ $h^2$ in Fig. 2,) and an exhaust-opening $k^2$, and $m$ is the valve proper, whose journal $m'$ has a crank $m^2$ on the outside, wristed as shown at $m^4$ to a connecting-rod $m^3$, while from the hanger $h'$ there depends a rod $h^3$, a spring $h^4$ being interposed between the lower end of this rod $h^3$ and the adjacent end of the connecting-rod $m^3$, which latter is wristed, as shown at $m^5$, to an arm $m^6$, rigidly secured, as shown at $m^7$, to a rod H, hereinafter described.

I is a slide-valve casing interposed between the ends of the described branch pipe $d$, in line with the pipe G, said casing being preferably made with two cylinders $n$ $n'$, the cylinder $n$ communicating directly at its outer end with the pipe G, and the cylinder $n'$ having, preferably, an opening $n^2$ at the side of its inner end communicating with an air-pipe G', leading from the rotary valve F of the truck at the other end of the train. If desired, there may be two separate slide-valves located at different points on the branch pipe $d$; but I prefer, ordinarily, the construction illustrated, as it economizes space, my described double-cylinder valve-casing being provided with a single central slide-valve I', having a central aperture $n^3$, corresponding to the passage in the pipe $d$, and with a piston-rod and piston $n^4$ $n^5$ at each end of said valve, the rod of the piston $n^4$ in the cylinder $n$ being surrounded by a spring $n^8$, as shown, and the slide-valve I' being recessed at one side, as shown at $n^6$, and the valve-casing having a release-opening $n^7$ for communicating therewith, when necessary, as hereinafter explained.

The before-named rod H is supported by means of hangers J from the under side of the car-bottom, said rod turning freely in its bearings in said hangers while bolted, keyed, or otherwise secured to the outer ends of said rod H. Beyond the said hangers are the hubs $o$ of arms $o'$, to the lower ends of which arms dogs $o^2$ are pivoted by bolts $o^3$, said dogs $o^2$ being formed with shoulders $o^4$ to limit their upward movement, being normally kept in horizontal position by springs $o^5$, secured to said arms $o'$. Hangers J' are secured to the bottom of the car, one over each of these truck-axles, to whose wheels brake-beams are applied, and these hangers are formed at their lower ends into cylinder-heads $J^2$, which at the center have upward hollow extensions $J^3$, with openings at the opposite sides thereof to receive sections of the pipe K, which leads from the main air-reservoir, and which heads $J^2$ have interiorly-screw-threaded annular flanges to receive the upper ends of the cylinders K', which latter have reduced lower portions $K^2$, the bottom of said cylinders being provided with a central sleeve $K^3$. A spring L rests in said lower part of each cylinder around the said sleeve $K^3$, and a piston-rod L' passes up through said sleeve, carrying a piston-head $L^2$ at its upper end, and an intermediate collar and annular plate $L^3$, fast on the rod L' and located just at the top of the spring L, at the normal expansion of the latter, and of such diameter as to move within the reduced portion $K^2$ of said cylinder when the spring is compressed by the action of the piston, as hereinafter explained.

An open vertical skeleton frame M extends from the base of the piston-rod L', and the lower part of this frame M is laterally extended to form a horizontal open skeleton frame M', the inner end of the frame M, which projects toward the longitudinal center of the car, being provided with a horizontally-perforated bearing $M^2$ to receive a rod N, having a head N' at its outer end for engagement, at the proper time, with the dog $o^2$, already named, a spring $N^2$ surrounding the said rod N between its head N' and the end of the bearing $M^2$.

P is a rod secured in the forked inner end of the rod N by a pivot-bolt $p$, and P' is a spring secured to the head of said bolt $p$, the said spring P' extending back over the rod P and having a bent end $p'$ passing into a perforation $p^2$ in the rod P, so that the rod P and its spring P' may always move together, and beyond the perforation $p^2$ the rod P is provided with a downward-projecting pin $p^3$, and beyond this the rod P is continued in a raised plane, as shown at $p^4$, terminating in a downward bend or hook $p^5$.

The rear end of the frame M adjacent to the wheel $i$ is formed with a hub $q$, horizontally bored for the reception of one end of the stud or arbor $q'$, which stud has a head $q^2$ and carries the hub $q^3$ of a friction-pulley Q, the other end of said hub $q^3$ terminating in a beveled pinion Q', next to which said stud has fast to it a collar $q^4$, on which rests a horizontally-revolving disk $Q^2$, secured to the collar $q^4$ by pivot-bolt $q^5$, the under side of the disk $Q^2$ being formed with bevel-gearing $q^6$, in mesh with the pinion Q', and there being an annular row of perforations $q^7 q^7$ through the disk $Q^2$ for engagement at the proper times with the pin $p^3$ of the rod P, and also for engagement with the pins $r$ $r$ on the periphery of the wheel R, loose on the stud $q'$ between the collar $q^4$ and hub $q$. The said stud is secured in any suitable way, as by washer $q^8$ and nut $q^9$, to said hub $q$, and also preferably keyed or bolted thereto to prevent turning. It will be understood, however, that if preferred the stud $q'$ may revolve, in which case the collar $q^4$ should be loose, and the hub $q^3$ fast on said stud or shaft $q'$, the wheel R being loose thereon in either event.

Rising from the rear part of the lower portion of the frame M M above the hub $q$ is a semicircular cam-plate S, provided with a vertical recess $s$ on its inner side at the central or highest part of said cam-plate, said recess having preferably downwardly and inwardly converging side walls, the cam-plate S being slotted or cut through at the top, as shown at $s'$, in line with the center of the recess $s$, and also having a pin $s^2$ projecting inwardly at about the bottom of said recess, and within the recess $s$ is a rocking plate T, having a slot $t$ in its lower part, through which said pin $s^2$ projects, there being a block $t'$ beneath said pin, and a spring $t^2$ between the under side of this block and the bottom of the slot $t$, the said spring being preferably kept in place by means of a pin $t^3$, rising from the bottom of said slot $t$, while the edges of the slot $t$ and block $t'$ may be so formed, as by beveling, that said block cannot fall out. The plate T has further a roller $t^4$ pivoted thereon, as shown at $t^5$, for engagement with the disk $Q^2$, and in its upper part a slot $t^6$, corresponding to the slot $s'$ in the cam-plate S, leaving arms $t^7 t^7$ on each side of the said slot $t^6$. U U are springs secured to each side of the hub $q$, and rising therefrom, the upper ends of said springs bearing against the rocking plate T. V W are the stop-cocks of the pipes B K at the ends of the cars.

The operation of my device will be readily understood from the foregoing description of its construction. As already stated, when the brakes are off, the passage is open from the brake-pipe B to the auxiliary reservoir C, and hence the pressure in the parts B and C is equal. In setting the brakes, a reduction of pressure is made in the pipe B, which causes the excess of pressure in the auxiliary reservoir to force the piston of the triple valve down and move the slide-valve down, so as to allow the air in the auxiliary reservoir (now of greater pressure than that in the brake-pipe) to pass directly into the brake-cylinder and apply the brakes. This is so well known that I have not deemed it necessary to show the construction of the triple valve $c$ in detail or section, and, as equally well known, when the pressure in the brake-pipe B is again increased above that in the auxiliary reservoir C, the piston in the triple valve $c$ is forced up, moving the slide-valve to its former position, opening communication from the brake-pipe to the auxiliary reservoir and permitting the air in the brake-cylinder D to escape, thus releasing the brakes. It sometimes happens, however, that when it is sought in the ordinary manner to apply the brakes that a wheel slips, and it is the special function of my present device to remedy this, to prevent flattening of the wheels caused by slipping. It has been found that the tendency of wheels to slip when the brakes are applied occurs when the rate of speed of the train has slackened to about twelve miles an hour or less, and when this decreased rate of speed is reached, then the engineer will admit air into the pipe K, (through a suitable cock attached to the main reservoir, not shown,) which will force down the piston-heads $L^2$ in the cylinders K', and with them the frames M M' and attachments, the heads N' of rods N pressing down the dogs $o^2$ against the force of the springs $o^5$, and the friction-pulleys Q engaging with the axles $i'$, which causes said pulleys Q to revolve, and they being in mesh with the gear-teeth on the disk $Q^2$, will revolve the latter, said disks $Q^2$ carrying with them the pins $p^3$ of the rods P and drawing rods N inward against the force of the springs $N^2$ to the position shown in dotted lines in Fig. 2, which enables the dogs $o^2$ to be restored to normal horizontal position by their springs $o^5$, the hooked ends $p^5$ of the rods P meanwhile traveling up the inclines of the cam-plates S to their highest points at the center thereof, freeing the pins $p^3$ of the rods P from engagement with the perforations $q^7$ of said disks $Q^2$, the pins $r$ on the periphery of the wheels R insuring the ejection of the pins $p^3$ by entering said perforations $q^7$, as best shown in Fig. 5, the described movement of each disk $Q^2$ serving by frictional contact with the roller $t^4$ on the rocking plate T to turn said plate, against the force of the springs U U, on its pivot $s^2$ from the position shown in Fig. 6 to that shown in Fig. 7, so that, as the bent or hooked end $p^5$ of the rod P reaches the center of the cam-plate S, one of the arms $t^7$ of plate T will be in line with the slot $s'$ of cam-plate S and hold the rod P in this drawn-back condition so long as the wheels $i$ are revolving; but as soon as said wheels begin to slip or fail to turn, the frictional force of the disk $Q^2$ against the roller $t^4$ will cease and the springs U U will act to restore the rocking plate T to its normal vertical position, (shown in Fig. 6,) and then the slots $t^6$ and $s'$ in the plates T and S will be in line with each other, and the spring $N^2$ will force the rods N and P back to their normal positions, the hooked end $p^5$ of rod P slipping through said slots $t^6$ and $s'$, when the head N' of rod N will strike the end of the dog $o^2$, which, through its arm $o\ o'$, will partially revolve rod H, and this, through arm $m^6$, connecting-rod $m^3$, and crank $m^2$, will rotate valve $m$ in valve-casing F to close exhaust $k^2$ and open the passage between branch pipes $k$ and $k'$, thereby admitting air from the auxiliary reservoir C and pipe E into pipe G, which moves piston $n^4$ in cylinder $n$ and slide-valve I', closing communication through opening $n^3$ in said valve I' between auxiliary reservoir C and brake-cylinder D, and establishing communication through recess $n^6$ in slide-valve I' and exhaust-opening $n^7$ in valve-casing I, so that air from brake-cylinder D is released through pipe $d$ and this opening $n^7$ when said air in brake-cylinder D is not released, as may sometimes happen, through the ordinary release in the triple valve $c$, which releases the brakes sufficiently to enable the wheels $i$ to turn again, and the moment this is done the friction-pulley Q commences to revolve again by the rotation of the axle $i'$, which serves to draw back the rod N by the hereinbefore-described action of the disk $Q^2$, rod P, and cam-plate S and their attachments away from the dog $o^2$, when the spring $h^4$ will draw the crank $m^2$ and valve $m$ back to the position shown in Fig. 2, closing the passage between branch pipes $k$ and $k'$ and opening exhaust $k^2$ and permitting air to escape therethrough from pipe G, and permitting the spring $n^8$ in cylinder $n$ of the valve-casing I to force the piston $n^4$ and valve I' back to their normal positions, (shown in Fig. 1,) closing the exhaust $n^7$, and opening the passage from the auxiliary reservoir C to brake-cylinder D and setting the brakes. After the stop has been made, the air in the pipe K is released by the engineer, when the springs L in the cylinders K' K² will force the piston-heads $L^3$ up, the piston-rods L' carrying with them the frames M M' and their attachments to their normal position. (Shown in Fig. 2.)

By my invention the flattening of wheels through slipping in the application of the automatic air-brake is prevented, and this is accomplished automatically and with a saving of air over the present guess-work methods now commonly in use.

Having thus described my invention, what I claim as new, and desire to secure by Letters Patent, is—

1. In a railway-air-brake system, the combination, with the axle and wheels of a railway-truck and air-actuated brakes applied thereto, of a pipe leading from the main air-reservoir, a cylinder communicating with said pipe located over said axle, a piston in said cylinder having a frame connected to the piston-rod, a friction-pulley carried by said frame for engagement with said axle at predetermined times, and mechanism connected to said frame in engagement with said pulley for operating the valves of the system when actuated by motion derived from the revolution of said axle, substantially as set forth.

2. In a railway-air-brake system comprising an auxiliary reservoir, triple-valve brake-cylinder, and connections, the combination of valve-controlled pipes leading from the auxiliary reservoir to the passage between the same and the brake-cylinder, a valve-casing interposed in said passage having a cylinder on each side thereof, said cylinders communicating with said valve-controlled pipes and said casing having an exhaust-opening therein, a slide-valve in said casing provided with a central opening normally registering with the said passage in which it is interposed, and a recess communicating with said exhaust when said central opening is closed to said passage, and a piston in each cylinder connected to said slide-valve, one of said pistons having a spring interposed between its head and said valve, substantially as set forth.

3. In a railway-air-brake system comprising an auxiliary reservoir, triple-valve brake-cylinder, and connections, the combination, with the axle and wheels of a railway-truck and air-actuated brakes applied thereto, of a pipe leading from the main air-reservoir, a cylinder communicating with said pipe located over said axle, a spring-controlled piston in said cylinder, a frame carried by the piston-rod, a stud or shaft carried by said frame, a friction-pulley on said stud or shaft for engagement with said axle at predetermined times, pipes communicating with the auxiliary cylinder and with the passage between the same and the brake-cylinder, a valve at the point of connection with said passage, another valve between said pipes, a shaft between said last-named valve and the said frame carried by the piston-rod, connections between said valve and said shaft, a dog carried by said shaft, a spring-controlled rod in said frame for engagement with said dog, and mechanism for receiving motion from said friction-pulley and communicating it to said rod, substantially as set forth.

In testimony that I claim the foregoing I have hereunto set my hand at Milwaukee, in the county of Milwaukee and State of Wisconsin, in the presence of two witnesses.

ARTHUR L. WAITE.

Witnesses:
  H. G. UNDERWOOD,
  FRANK C. McCUTCHEON.